US012162103B2

(12) United States Patent
Lizotte et al.

(10) Patent No.: US 12,162,103 B2
(45) Date of Patent: Dec. 10, 2024

(54) SYSTEMS AND METHODS TO MONITOR THE LIFE OF A WELDING TORCH (71) Applicant: Illinois Tool Works Inc., Glenview, IL (US)

(72) Inventors: Ryan Lizotte, Ontario (CA); Tiejun Ma, Ontario (CA); Romeo Cossette, Ontario (CA)

(73) Assignee: Illinois Tool Works Inc., Glenview, IL (US)

( * ) Notice: Subject to any disclaimer, the term of this patent is extended or adjusted under 35 U.S.C. 154(b) by 317 days.

(21) Appl. No.: 16/878,177

(22) Filed: May 19, 2020

(65) Prior Publication Data
US 2020/0376583 A1 Dec. 3, 2020

Related U.S. Application Data (60) Provisional application No. 62/856,476, filed on Jun. 3, 2019.

(51) Int. Cl.
B23K 9/12 (2006.01)
B23K 9/095 (2006.01)
(Continued)

(52) U.S. Cl.
CPC ............ B23K 9/125 (2013.01); B23K 9/0956 (2013.01); B23K 9/122 (2013.01); B23K 9/14 (2013.01); B23K 37/006 (2013.01); B23K 9/133 (2013.01)

(58) Field of Classification Search
CPC ... B23K 9/122–125; B23K 9/133; B23K 9/14
(Continued)

(56) References Cited

U.S. PATENT DOCUMENTS 3,836,747 A * 9/1974 Wlos ...................... B23K 9/291
174/46
4,540,871 A * 9/1985 Corrigall .................. H01H 9/06
219/137.31
(Continued)

FOREIGN PATENT DOCUMENTS

DE 19839719 A1 * 3/2000 ............. B23K 9/095
DE 202016001105 7/2016
(Continued)

OTHER PUBLICATIONS

Machien translation of DE 19839719 performed on Oct. 20, 2022.*
(Continued)

Primary Examiner — Nathaniel E Wiehe
Assistant Examiner — Alba T Rosario-Aponte
(74) Attorney, Agent, or Firm — McAndrews, Held & Malloy, Ltd.

(57) ABSTRACT

An example wire feeder includes: a frame; a receptacle configured to transfer welding-type current to a welding torch via a torch connector, and to position the torch connector to receive a wire electrode; one or more drive rolls configured to drive the wire electrode to the welding torch, the one or more drive rolls being electrically insulated from the frame, and wherein the wire electrode is electrically insulated from the frame; and a sensor configured to determine at least one of a voltage or an impedance between a first point electrically coupled to the wire electrode and a reference point.

15 Claims, 8 Drawing Sheets (51) Int. Cl.
   *B23K 9/133* (2006.01)
   *B23K 9/14* (2006.01)
   *B23K 37/00* (2006.01)

(58) Field of Classification Search
   USPC .............. 219/137.71, 137.2, 137.31, 137.44,
                              219/137.51, 137.52, 137.61
   See application file for complete search history.

(56) References Cited

U.S. PATENT DOCUMENTS

| | | | |
|---|---|---|---|
| 6,307,177 B1 | 10/2001 | Herrich | |
| 6,657,163 B1 * | 12/2003 | Blankenship | ........ B23K 9/173 |
| | | | 219/130.01 |
| 10,144,080 B2 * | 12/2018 | Chantry | .............. B23K 9/1056 |

FOREIGN PATENT DOCUMENTS

| | | | |
|---|---|---|---|
| JP | H079562 U | * | 2/1995 |
| JP | H07167723 | | 7/1995 |
| JP | 2007121102 A | * | 5/2007 |
| JP | 2009232599 A | * | 10/2009 |
| WO | WO-2018164867 A1 | * | 9/2018 ........ B23K 9/1006 |

OTHER PUBLICATIONS

Machine translation of JPH079562 performed on Oct. 21, 2022.*
European Patent Office, Communication with extended European search report in Application No. 20177743.0, dated Nov. 2, 2020 (8 pages).
Canadian Office Action Appln No. 3,081,249 dated Jul. 6, 2021.
European Office Communication Appln No. 20177743.0, dated Mar. 29, 2023, 6 pages.

* cited by examiner

SYSTEMS AND METHODS TO MONITOR THE LIFE OF A WELDING TORCH

RELATED APPLICATIONS

The present application claims the benefit of U.S. Provisional Patent Application Ser. No. 62/856,476, filed Jun. 3, 2019, entitled "SYSTEMS AND METHODS TO MONITOR THE LIFE OF A WELDING TORCH." The entirety of U.S. Provisional Patent Application Ser. No. 62/856,476 is expressly incorporated herein by reference.

BACKGROUND

The present disclosure relates to welding systems and apparatus, and, more particularly, to systems and methods to monitor the life of a welding torch.

Welding is a process that has increasingly become ubiquitous in all industries. A wide range of welding systems and welding control regimes have been implemented for various purposes. In continuous welding operations, gas metal arc welding ("GMAW") techniques allow for formation of a continuing weld bead by feeding welding wire shielded by inert gas from a welding torch. Electrical power is applied to the welding wire at a welding torch and a circuit is completed through the workpiece to sustain a welding arc that melts the electrode wire and the workpiece to form the desired weld. Voltage across the welding arc is less than the voltage output by the welding-type power source because of voltage drops across conductors of the welding circuit. Welding torches decay over time with use, which may cause undesirable effects.

SUMMARY

The present disclosure relates to welding systems and methods, more particularly, to systems and methods that determine an impedance of a welding torch or a voltage drop across a welding torch to monitor the decay of the welding torch, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Predictive maintenance, or failure prediction, is desirable in various welding applications, including automatic welding applications. Especially in automatic welding applications, the high cost of operation, lost production, lack of preventative maintenance, and just-in-time production requirements result in an increased desire to avoid unplanned downtime. Currently, there is no accurate or convenient way to predict the failure of a GMAW, metal inert gas ("MIG"), or metal active gas ("MAG") torch until a catastrophic failure occurs. A catastrophic failure of the welding torch can cause various undesirable results, including damaged welding equipment, damaged control systems, and defective welds. MIG welding torches may have several failure mechanisms, including leaking shielding gas, electrode wire feeding jams, damaged insulation due to thermal or mechanical overload, conductor decay (e.g., copper wires breaking inside the flexible cable), and loose component connections. Disclosed example systems monitor the decay of the conductor of the torch via tracking the impedance and/or voltage drop across the conductor in order to determine and predict the decay and/or life of the torch.

In disclosed example systems, the wire electrode is electrically isolated from the welding circuit except for at the front end of the welding torch. For example, the electrode wire may be electrically insulated from the frame of the wire feeder (e.g., a chassis or a connector between the power cable and the torch) and from the weld circuit for the length of the electrode that is between the source of the electrode wire (e.g., a wire drum, a wire spool, etc.) and the contact tip at the welding-type torch. As a result, the electrode wire carries the same voltage as the contact tip even within the wire feeder. The voltage at the front end of the welding torch is measured by measuring the voltage at the wire electrode. This voltage at the wire electrode can be compared to the voltage at the wire feeder to determine the voltage drop across, and therefore the impedance of, the torch. The impedance of the torch can be monitored over time, and the trend(s) and/or feature(s) of changes in the impedance may be used to predict a decay or failure of the torch. For example, control circuitry can determine a root failure cause based on the shape of the trend. A signal can be output to alarm or alert an operator or service technician when a torch is near failure and the signal can indicate the type of failure.

The terms "welding-type power supply" and "welding-type power source," as used herein, refer to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

The term "welding-type system," as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

The term "welding-type operation," as used herein, includes both actual welds (e.g., resulting in joining, such as welding or brazing) of two or more physical objects, an overlaying, texturing, and/or heat-treating of a physical object, and/or a cut of a physical object) and simulated or virtual welds (e.g., a visualization of a weld without a physical weld occurring).

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy. Electric power of the kind measured in watts as the product of voltage and current (e.g., V*I power) is referred to herein as "wattage."

The terms "control circuit" and "control circuitry," as used herein, may include digital and/or analog circuitry, discrete and/or integrated circuitry, microprocessors, digital signal processors (DSPs), and/or other logic circuitry, and/or associated software, hardware, and/or firmware. Control circuits may include memory and a processor to execute instructions stored in memory. Control circuits or control circuitry may be located on one or more circuit boards, that form part or all of a controller, and are used to control a welding process, a device such as a power source or wire feeder, motion, automation, monitoring, air filtration, displays, and/or any other type of welding-related system.

As utilized herein the terms "circuits" and "circuitry" refer to physical electronic components, any analog and/or digital components, power and/or control elements, such as a microprocessor or digital signal processor (DSP), or the like, including discrete and/or integrated components, or portions and/or combination thereof (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

As used herein, the terms "torch," "welding torch," or "welding tool" refer to a device configured to be manipulated to perform a welding-related task, and can include a hand-held welding torch, robotic welding torch, gun, or other device used to create the welding arc.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

Disclosed example wire feeders include a frame, a receptacle configured to transfer welding-type current to a welding torch via a torch connector and to position the torch connector to receive a wire electrode, one or more drive rolls configured to drive the wire electrode to the welding torch, the one or more drive rolls being electrically insulated from the frame, in which the wire electrode is electrically insulated from the frame, and a sensor configured to determine at least one of a voltage or an impedance between a first point electrically coupled to the wire electrode and a reference point.

In some example wire feeders, the reference point is electrically coupled to the frame. In some example wire feeders, the first point is electrically equivalent to a contact tip of the welding torch. In some example wire feeders, the first point is electrically equivalent to a retaining head of the welding torch.

Some example wire feeders include processing circuitry configured to determine at least one condition of the welding torch based on the voltage or the impedance. Some example wire feeders include processing circuitry configured to determine the impedance based on the voltage divided by a measured welding-type current.

Some example wire feeders include processing circuitry configured to compare the impedance to a threshold impedance, and output a signal when the torch impedance satisfies the threshold impedance. In some examples, the signal provides an alert to an operator. In some example wire feeders, the signal includes a command to cut off welding power to the torch, cut off welding power to the wire feeder, or shutdown the wire feeder. Some example wire feeders include processing circuitry configured to monitor a change in the impedance, and predict a type of torch failure based on the change.

In some example wire feeders, the type of torch failure is one of a broken conductors inside a torch cable, a loose connection between components, improper installation of a component, a decayed rotating connection, or a damaged insulation failure. Some example wire feeders include processing circuitry configured to monitor a rate of increase in impedance and predict a type of torch failure based on the rate. Some example wire feeders include processing circuitry configured to monitor a change in the impedance, and predict a failure time based on the change.

Some example wire feeders include a wire guide configured receive the wire electrode and guide the wire electrode to the one or more drive rolls, in which the wire guide includes a conductive layer configured to guide the wire electrode, and an insulative layer configured to electrically insulate the wire electrode and the conductive layer from the frame. In some example wire feeders, the wire guide includes a mono-coil spring. In some example wire feeders, the wire guide includes an outer metal tube layer.

Disclosed example welding systems include a welding torch comprising a contact tip configured to conduct welding-type current to a wire electrode, a wire feeder configured to feed the wire electrode from a wire electrode source to the welding torch, a conductive path to deliver welding power from a welding-type power supply to the contact tip, an electrically insulated path to deliver the wire electrode from the wire electrode source to the contact tip, and a sensor configured to determine at least one of a voltage or an impedance between a first point coupled to the wire electrode and a reference point.

Some example welding systems further include processing circuitry configured to determine at least one condition of the welding torch based on the voltage or the impedance. Some example welding systems further include processing circuitry configured to compare the impedance to a threshold impedance, and output a signal when the torch impedance satisfies the threshold impedance. Some example welding systems further include processing circuitry configured to monitor a change in the impedance, and predict a type of torch failure based on the change. In some example welding systems, the reference point includes a frame of the wire feeder or a front end of a cable of the welding torch.

Figure 1:
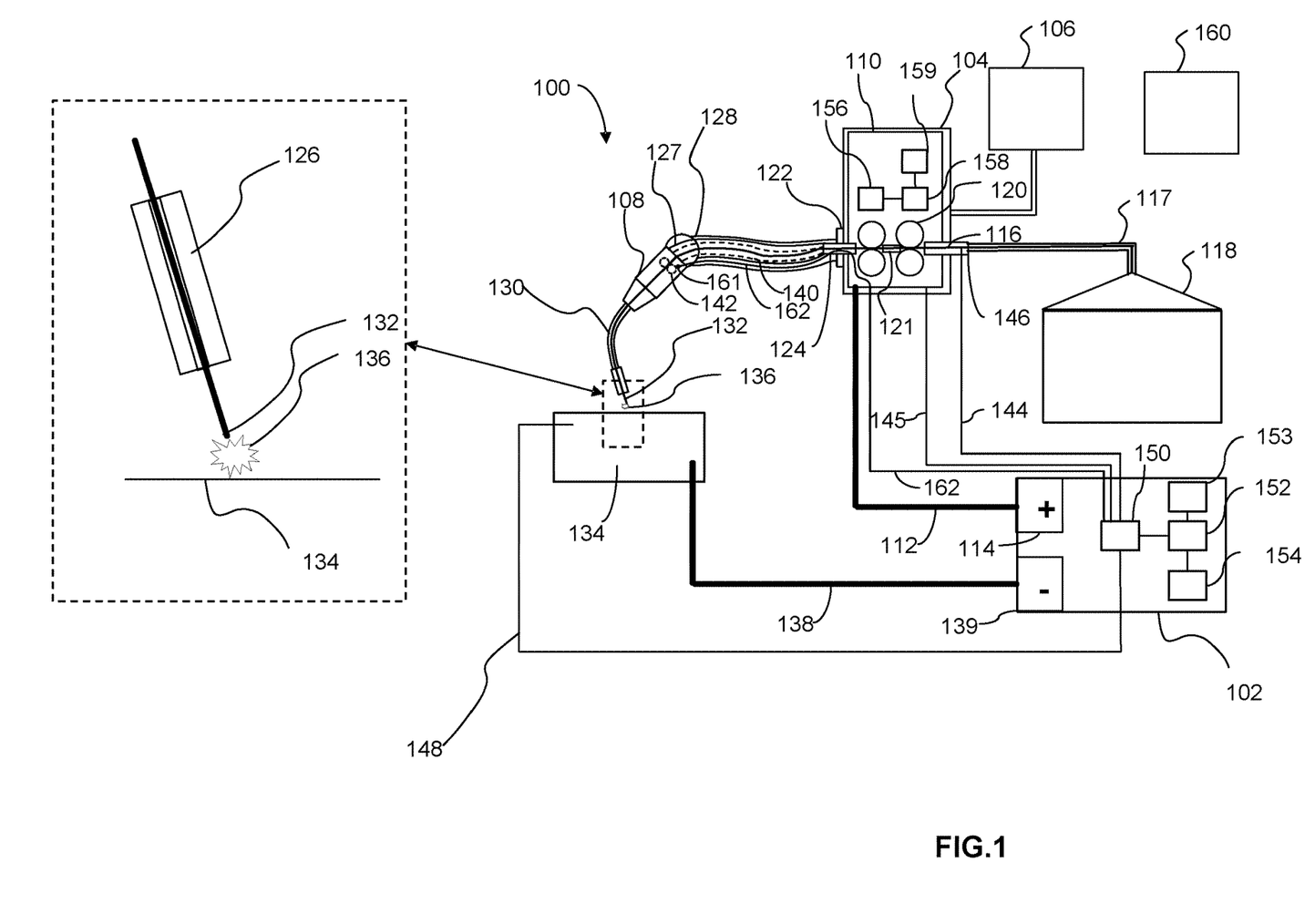
FIG. 1 is an illustration of an example welding-type system in accordance with aspects of this disclosure.

FIG. 1 illustrates an exemplary GMAW system 100 including a welding-type power source 102, a wire feeder 104, a gas cylinder 106, and a torch 108. The welding-type power source 102 includes power conversion circuitry configured to condition input power (e.g., from the AC power grid, an engine/generator set, a combination thereof, or other alternative sources) to welding-type power.

The example wire feeder 104 includes a wire feeder frame 110 that is electrically connected to the welding-type power source 102 via one or more cables 112 which may include power and/or control conductors and/or cables. The cable 112 is connected to an output terminal 114 of the welding-type power source. The wire feeder 104 feeds welding wire electrode 116 from a wire source 118 (e.g., a wire spool, a wire drum, etc.) to the torch 108 via one or more drive rolls 120.

In the example of FIG. 1, the wire electrode 116 is delivered from the wire electrode source 118 to the wire feeder 104 via an insulated conduit 117. While in the illustrated example system 100, the wire electrode source 118 is illustrated as external to the wire feeder 104, in some examples the wire electrode source 118 (e.g., wire spool) is integrated into (e.g., internal to an enclosure of) the wire feeder 104. Further, while the wire feeder 104 is illustrated as external to the welding-type power source 102, in some examples the wire feeder 104 may be integrated into an enclosure of the welding-type power source 102.

During a welding operation, the welding-type power source 102 outputs welding-type current from the terminal 114 to the wire feeder 104 via the cable 112. In other examples, the wire feeder 104 is integrated into the power source 102, in which case the cable 112 may be internal to the power source and/or be connectable to the terminal 114. The example wire feeder 104 of FIG. 1 may include circuitry (e.g., conductors, a contactor, power conversion circuitry, etc.) configured to deliver the welding-type current to the welding torch 108 that is connected to the wire feeder 104.

By way of the wire feeder 104, the welding-type power is electrically connected to a wire feeder receptacle 122 configured to receive a torch connector 124. The torch connector 124 includes a power pin to receive the welding-type current and a wire liner cap to receive the wire electrode 116 and guide the wire electrode 116 into an insulated wire liner. Welding-type current is directed to the receptacle 122 and to the torch connector 124. The torch connector 124 conducts the welding-type current to the torch 108 via a conductor 127 included within a torch cable 128. The cable 128 also delivers shielding gas and the wire electrode 116 from the wire feeder 104 to the torch 108.

From the conductor 127, the torch 108 conducts the welding-type current to the contact tip 126 (e.g., via one or more conductors and/or components within the torch 108) for delivery to the wire electrode 116. The welding-type current flows from the contact tip 126 to the wire electrode 116 and arcs from the end 132 of the wire electrode 116 to the workpiece 134. During a welding operation, a substantial voltage drop occurs across the arc 136 between the wire electrode end 132 and the workpiece 134. A ground cable 138 connects the workpiece 134 (e.g., via a clamp, bolt, or plug) to a second power terminal 139 of the welding-type power source 102 to complete the weld circuit between the welding-type power source 102, the wire feeder 104, the torch 108, and the workpiece 134.

In the example system 100, the wire electrode 116 is electrically insulated from the welding-type current except at the contact tip 126 (and/or any other location within the torch 108). The wire electrode 116 is insulated from the conductor 127 of the cable 128 and from the torch body 108 via an insulated wire liner 140 which delivers the wire electrode 116 from the torch connector 124. In some examples, the wire electrode 116 may be in electrical contact with the insulated wire liner 140, while the wire liner 140 is electrically insulated from the conductor 127.

Within the wire feeder 104, the wire electrode 116 is insulated from the wire feeder frame 110 and from any circuitry conducting the welding-type current. For example, the one or more drive rolls 120 are electrically insulated from at least one of the electrode wire 116 or the wire feeder frame 110. For example, the drive rolls 120 may be insulated from the frame 110 such that the one or more drive rolls 120 are electrically isolated from the wire feeder frame 110 even when no wire electrode 116 is installed.

In some examples, if the wire feeder 104 includes two sets of drive rolls 120, the wire feeder 104 also includes a middle guide 121 between the two sets of drive rolls 120. The middle guide 121 guides and supports the wire electrode 116 between the sets of drive rolls 120, and insulates the wire electrode 116 from the wire feeder frame 110. The insulated wire liner 140 may include an insulator to electrically insulate the wire electrode 116 from the receptacle 122 and the torch connector 124, and/or the receptacle 122 and the torch connector 124 may include insulation layers to electrically insulate the wire electrode 116 from the welding circuit.

If the torch 108 includes one or more drive rolls 142 to pull wire electrode 116 to the torch (i.e., if the system 100 is a push-pull system) the drive rolls 142 are also insulated from the welding circuit.

In the illustrated example, a voltage sense cable 144 is connected to the wire electrode 116, for example at a wire guide 146. The wire guide 146 receives wire electrode 116 from the wire source 118 and guides the wire electrode to the one or more drive rolls 120. The example wire guide 146 includes an inner conductive layer to guide the wire electrode 116 and an outer insulative layer to electrically insulate the wire electrode 116 from the wire feeder frame 110. The voltage sense cable 144 may be connected to the conductive layer of the wire guide 146. When the wire electrode 116 is electrically insulated from the welding circuit, and, therefore, does not conduct current, the voltage at the wire electrode 116 is equal to the voltage at the contact tip 126 (or the point along the torch 108 at which the wire electrode 116 is electrically contacts the conductors of the welding circuit). Accordingly, in the system 100, sensing the voltage at the wire electrode 116 is equivalent to (e.g., has the same measurement as) sensing the voltage at the contact tip 126 (or the point along the torch 108 at which the wire electrode 116 electrically contacts the conductors of the welding circuit).

In the illustrated example, a second voltage sense cable 145 is connected to the wire feeder frame 110 or another reference point. Although illustrated as cables, the voltage sense cables 144, 145 may be any conductive paths electrically connected to the wire electrode 116, and the wire feeder frame. A voltmeter 150 is connected to the first voltage sense cable 144 and the second voltage sense cable 145. The voltmeter 150 can therefore measure the voltage between the wire electrode 116 wire electrode 116 and the wire feeder frame 110, which is equal to the voltage between the wire feeder frame 110 and the point where the conductor 127 contacts the wire electrode 116 in the torch 108. Accordingly, this voltage is equivalent to the voltage drop across the conductor 127 of the torch 108.

The voltmeter 150 may send a signal representative of the voltage between the wire electrode 116 and the wire feeder frame 110 to control circuitry 152 of the welding-type power source 102. The control circuitry 152 may track and use this voltage data to predict a failure mechanism of the torch 108. The control circuitry 152 may store and retrieve data from memory (e.g., memory of the control circuitry 152). The control circuitry 152 may also determine the torch impedance based on the voltage between the wire electrode 116 and the wire feeder frame 110. The torch impedance equals the torch voltage (e.g., the voltage between the wire electrode 116 and the wire feeder frame 110) divided by the welding current. The control circuitry 152 controls the welding current, and thus the welding current is a known value. Alternatively, a current sensor may measure the welding current, and the torch impedance is determined by dividing the measured torch voltage by the measured welding current. The control circuitry 152 may track the change in torch impedance over usage time to predict a failure mechanism of the torch 108. The control circuitry 152 may analyze features in the torch impedance over time to predict failure mechanisms of the torch 108.

The control circuitry 152 may also store this voltage data in memory. In some examples, the voltage sense cables 144, 145 send voltage sense signals directly to the control circuitry 152, and the control circuitry processes the signals and calculates the voltage between the wire electrode 116 and the wire feeder frame 110.

The welding-type power source 102 may also include communications circuitry 154. The communications circuitry 154 enables the control circuitry 152 to communicate with control circuitry 156 of the wire feeder 104 via communications circuitry 158 of the wire feeder 104. The communications circuitry 154 may also enable the control circuitry 152 to communicate with external computing devices 160 (i.e., smartphones, personal computers, servers, cloud infrastructure, robot controller, production cell or production line controller, etc.) The communications circuitry 154 and the communications circuitry 158 may communicate via wired (e.g., via an ethernet or serial cable, via signals transposed over the power cable 112, etc.) or wireless connections (e.g., Wi-Fi, Bluetooth, Near-Field Communication, ZigBee, RuBee, or the like). The control circuitry 152 may transmit voltage data sensed by the voltage sense cables 144, 145 to an external computing device 160 via the communications circuitry 154. The control circuitry 152 may, via the communications circuitry 154, send commands to the wire feeder control circuitry 156 to adjust wire feeder 104 settings (e.g., warning display, stopping wire feeding, etc.) based on the voltage signals received from voltage sense cables 144, 145.

Although illustrated as internal to the welding-type power source 102, the voltmeter 150 may be external to the welding-type power source 102. For example, the voltmeter 150 may be a separate voltmeter, or may be integrated into the wire feeder 104.

The voltage data from the voltage sense cables 144, 145 may also or alternatively be received by control circuitry 156 of the wire feeder 104 or an external computing device 160. For example, the voltage sense cables 144, 145 may be connected to control circuitry 156 of the wire feeder 104. The control circuitry 156 may determine the voltage between the wire electrode 116 and the wire feeder frame 110. The control circuitry 156 may track and use this voltage between the wire electrode 116 and the wire feeder frame to predict a failure mechanism of the torch 108. The control circuitry 156 may also determine the torch impedance based on the voltage between the wire electrode 116 and the wire feeder frame 110. The torch impedance equals the torch voltage divided by the welding current. The welding current may be a known value, or alternatively, a current sensor may measure the welding current. The torch impedance is determined by dividing the torch voltage by the measured torch impedance. The control circuitry 156 may track the change in torch impedance over usage time to predict a failure mechanism of the torch 108.

Although illustrated as connected to the contact tip 126, the wire electrode 116 may be electrically contacting any point along the torch 108.

Figure 2:
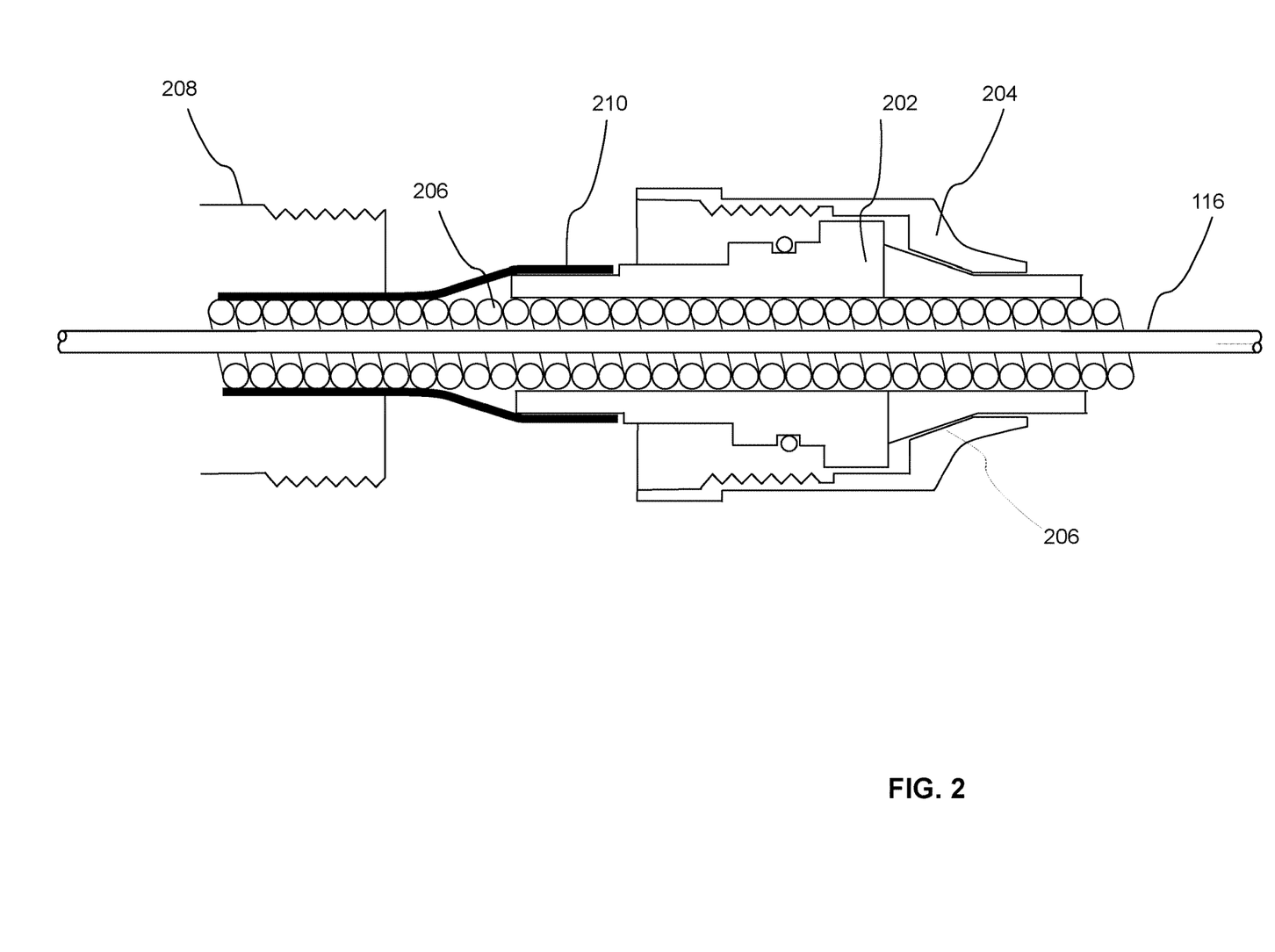
FIG. 2 is an illustration of an example welding torch wire liner and torch connector.

FIG. 2 illustrates a liner adapter 202, a liner cap 204, a monocoil liner 206, and a power pin 208, which may be used in the torch 108 and cable 128 of the system 100 of FIG. 1. The liner adapter 202 may be made of any suitable electrically insulative material, such as a plastic. The monocoil liner 206, as well as the wire electrode 116 inside the monocoil liner 206, is therefore insulated from the power pin 208.

Electrically insulative heat shrink 210 covers the monocoil liner 206 the remaining length of the monocoil liner 206. The monocoil liner 206 (and accordingly the wire electrode 116 within the monocoil liner 206) is therefore insulated from any conductive components of the cable 128 or torch 108 electrically connected to the welding circuit except for at the front end of the torch 108 (e.g., at the contact tip 126 or retaining head of the torch 108).

For non-ferrous wire welding, the monocoil liner 206 may be a plastic tube. In that case, the wire electrode 116 is insulated inside the power pin 208 and the wire liner. If the system includes a torch with a pull motor, (i.e., the torch 108 includes one or more drive rolls 142 to pull wire electrode 116 to the torch), the drive rolls 142 are also insulated from the welding circuit.

Figure 3:
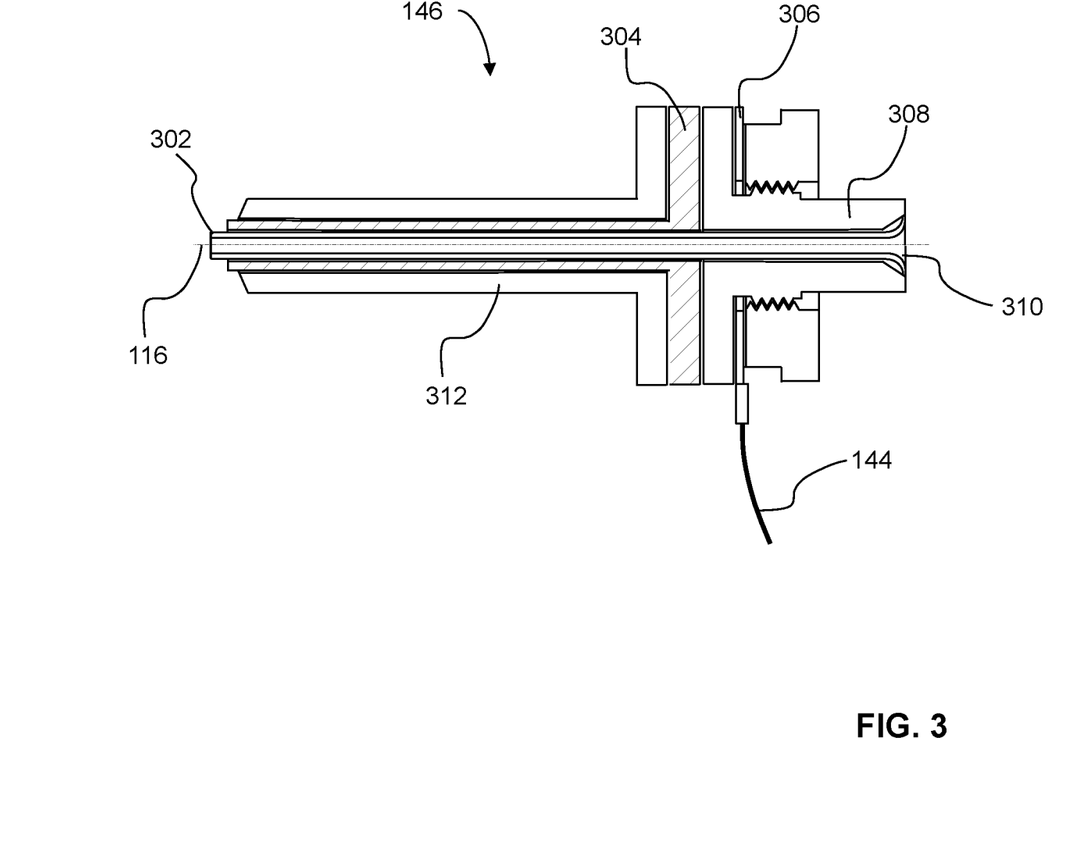
FIG. 3 is an illustration of an example inlet wire feeder wire guide.

FIG. 3 illustrates an example implementation of wire guide 146 which insulated the wire electrode 116 from the wire feeder frame 110. The example wire guide 146 is composed of a conductive, wear resistant metal core tube 302 and an insulation layer 304. A voltage sensing cable 144 is electrically connected to the metal core 302 to pick up the voltage signal from the wire electrode 116. As illustrated, the voltage sense cable 144 is indirectly connected to the core tube 302 through a washer 306 and a retaining seat 308. The wire receiving end 310 of the wire guide 146 has a taper for a wire inlet. In some examples, the wire receiving end is alternatively a quick disconnector coupler that couples to a conduit that delivers the wire electrode 116 from the wire electrode source 118 to the wire guide 146. The core tube 302 may have a conductive mono-coil spring within as a jump liner, and the monocoil spring may extend out of the wire receiving end 310.

The core tube 302 may also have other mechanisms to ensure that the core tube 302 is electrically connected to the wire electrode 116 in order to ensure that the voltage sense cable reads the voltage at the wire electrode 116. Such mechanisms may include floating or sliding contact mechanisms. In some examples, the wire guide 146 may include an additional metal tube layer 312 outside of the insulation layer 304 which provides structural support.

Figure 4:
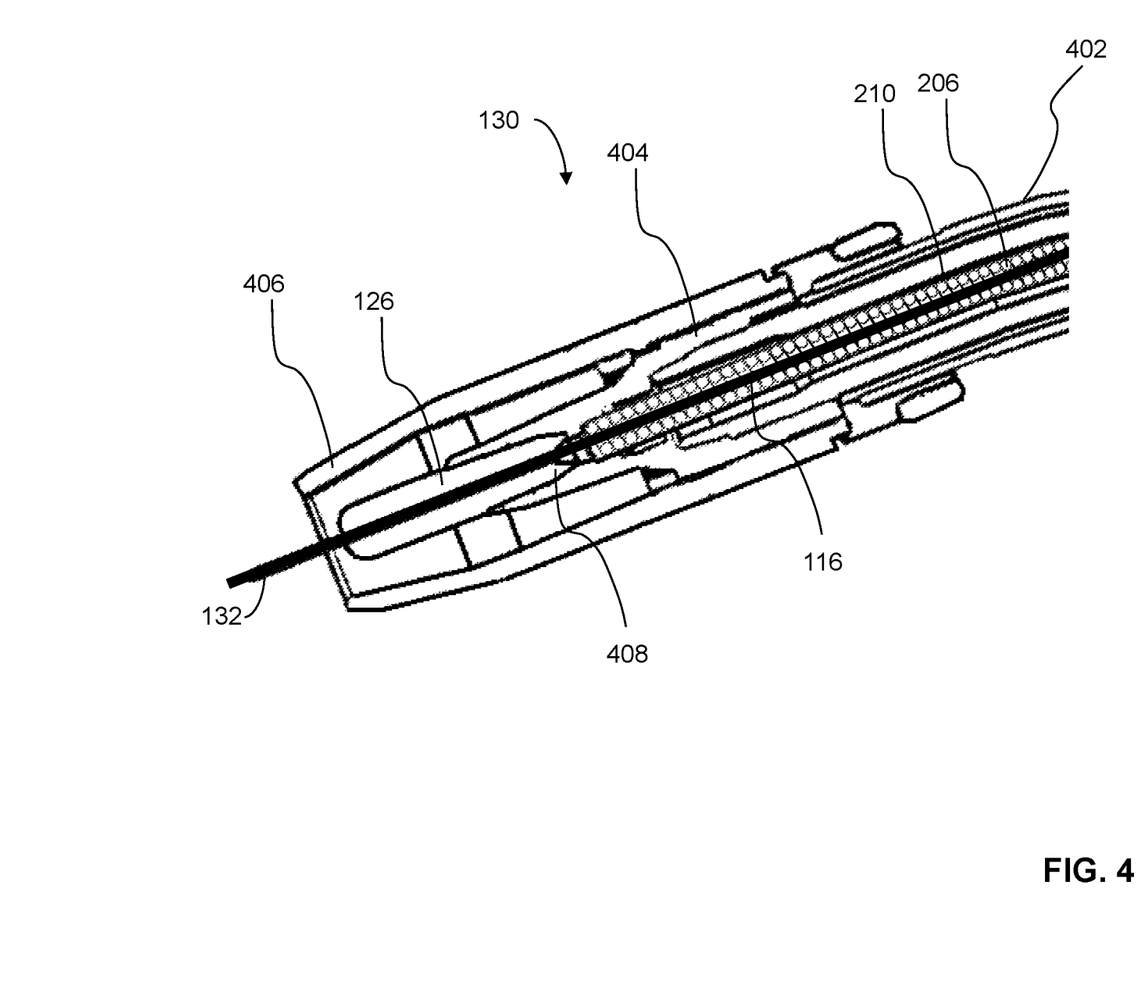
FIG. 4 is an illustration of an view of a front end of an example welding torch.

FIG. 4 illustrates the front end 130 of the welding torch 108, which includes the gooseneck 402, the retaining head 404, the nozzle 406, and the contact tip 126. The wire liner includes a monocoil 206 covered by an insulated heatshrink 210. As illustrated, the insulated wire liner stops at the contact tip 126. As the wire liner is covered by insulated heatshrink 210, the wire electrode 116 is insulated from the conductors of the torch 108, except the contact tip 126. Therefore, the voltage signal picked up by the voltage sense cable 144 (FIG. 1), will represent the voltage at the contacting point between the wire electrode 116 and the conductors of the torch 108, which as illustrated is the back end 408 of the contact tip 126.

If the heatshrink 210 does not extend as far, and the monocoil 206 contacts the retaining head 404, then the contact point between the wire electrode and the conductors of the torch 108 will be that point on the retaining head 404. In that case, the voltage signal picked up by the voltage sense cable 144 (FIG. 1), will represent the voltage at the point of the retaining head 404 that contacts the monocoil 206. Accordingly, by trimming back the end of the heatshrink 210, it is possible to measure the voltage at any position from the back end 408 of the contact tip 126 to the torch 108 body.

Returning to FIG. 1, the voltage sense cable 144 picks up the voltage of the wire electrode 116, which represents the voltage at the front end 130 of the torch 108, which is labelled tip voltage $V_{tip}$. While the voltage sense cable 144 is illustrated as connected to the wire electrode 116 within the wire guide 146, the voltage sense cable 144 could be electrically connected to the wire electrode 116 at alternative pickup locations. For example, the voltage sense cable could be electrically connected to one or more of the drive rolls 120, an inner conductor of the middle guide 121, the receptacle 122, the monocoil 206 of the wire liner, the wire electrode 116 within the conduit 117, or the wire electrode 116 within the wire electrode source 118.

Uecker et al. (U.S. Pat. No. 6,066,032) disclosed a voltage sense lead 162 that picks up the voltage at the front end of the torch cable 161. By using the sense lead 162 in addition to sense leads 144 and 145, the control circuitry 152, 156 will have three voltage measurements: (1) the wire feeder frame 110, or the feeder receptacle 122; (2) the front end 161 of the torch cable; and (3) the wire electrode 116, or the contact tip 126. By comparing these voltage measurements, the location of potential failure within the torch 108 can be more specifically located or predicted. For example, a difference between the voltage at the wire feeder frame 110 (or feeder receptacle 122) and the voltage at the front end 161 may be monitored by the control circuitry 152, 156 to identify and/or predict a failure in the cable 128. Additionally or alternatively, a difference between the voltage at the front end 161 and the voltage at the contact tip 126 may be monitored by the control circuitry 152, 156 to identify and/or predict a failure in the gooseneck and/or a retaining head for the contact tip 126.

The voltage sense leads 144, 145, 162 and the grounding sense lead 148 may be received at the voltmeter 150 and the control circuitry 152, at the control circuitry 156, and/or shared between the control circuitry 152, 156. Additionally or alternatively, the voltage sense leads 144, 145, 162 and the grounding sense lead 148 may be received by separate data acquisition apparatus.

The difference between $V_{tip}$, measured by the first voltage sense cable 144, and the voltage at the wire feeder frame 110, labelled $V_{feeder}$, equals the torch voltage, $V_{torch}$. Control circuitry 152 or 156 can use the determined $V_{torch}$ and the known welding current $I_{weld}$ to determine the impedance of the torch, $R_{torch}$.

Control circuitry 152 or 156 monitors $R_{torch}$ during use of the torch 108, which allows the control circuitry 152 or 156 to determine the torch 108 condition in real time. For purposes of data processing, the average torch impedance $R_{torch}$ during one weld or multiple welds can also be used to determine the condition of the torch 108.

As the conducting channel 127 (i.e., copper wires, the crimp at the joint, or other parts of the torch that carry welding current) of the torch 108 deteriorates, the measured impedance $R_{torch}$ will increase. Monitoring the impedance $R_{torch}$ over time enables the control circuitry 152, 156 (or an external computing device 160 which tracks the torch impedance $R_{torch}$ over time) to predict failure times of the torch 108, predict likely failure modes, and/or schedule maintenance prior to torch 108 failure. In some examples, the external computing device 160 schedules maintenance during planned system downtime (e.g., during scheduled breaks) and/or based on an estimated failure time. Accordingly, torch 108 defects can be fixed before they cause catastrophic damage.

Different shapes of impedance trends over usage time can suggest different types of failure mechanisms. For example, different types of wear and/or failure can manifest as different rates of change in the impedance (e.g., impedance slopes). For example, gradual decay of the copper wires has a specific range of impedance slopes. A sudden loose connection, such as between the contact tip 126 and the retaining head 404, between the retaining head 404 and the gooseneck 402, between the gooseneck 402 and the torch body, and/or between the power pin 208 and the feeder receptacle 122, may each have specific impedance-time feature(s) that can be identified to predict the specific type of failure that may occur (or has occurred). By identifying these impedance-time slope(s) and/or feature(s) during operation, the control circuitry 152, 156 and/or the external computing device 160 may determine a failure mechanism and alert the relevant technical personnel to perform preventative maintenance and/or guide repair.

In some examples, the torch 108 may include an RFID tag that includes initial torch impedance information. An RFID reader within the wire feeder 104 may read the RFID tag and determine the initial torch impedance. During operation, the control circuitry 152 or 156 may compare the actual torch impedance to the initial torch impedance, and when the actual torch impedance had increased from the initial torch impedance by a threshold amount, the control circuitry determines that the torch 108 requires maintenance.

In some examples, a user may input the type of torch into a user interface 159 of the wire feeder 104, a user interface 153 the welding-type power source 102, or an external computing device 160. The control circuitry 152 or 156 then retrieves an initial torch impedance from memory based on the input torch type. Then during operation, the control circuitry 152 or 156 may compare the actual torch impedance to the initial torch impedance, and when the actual torch impedance had increased from the initial torch impedance by a threshold amount, the control circuitry determines that the torch 108 requires maintenance.

Figure 5:
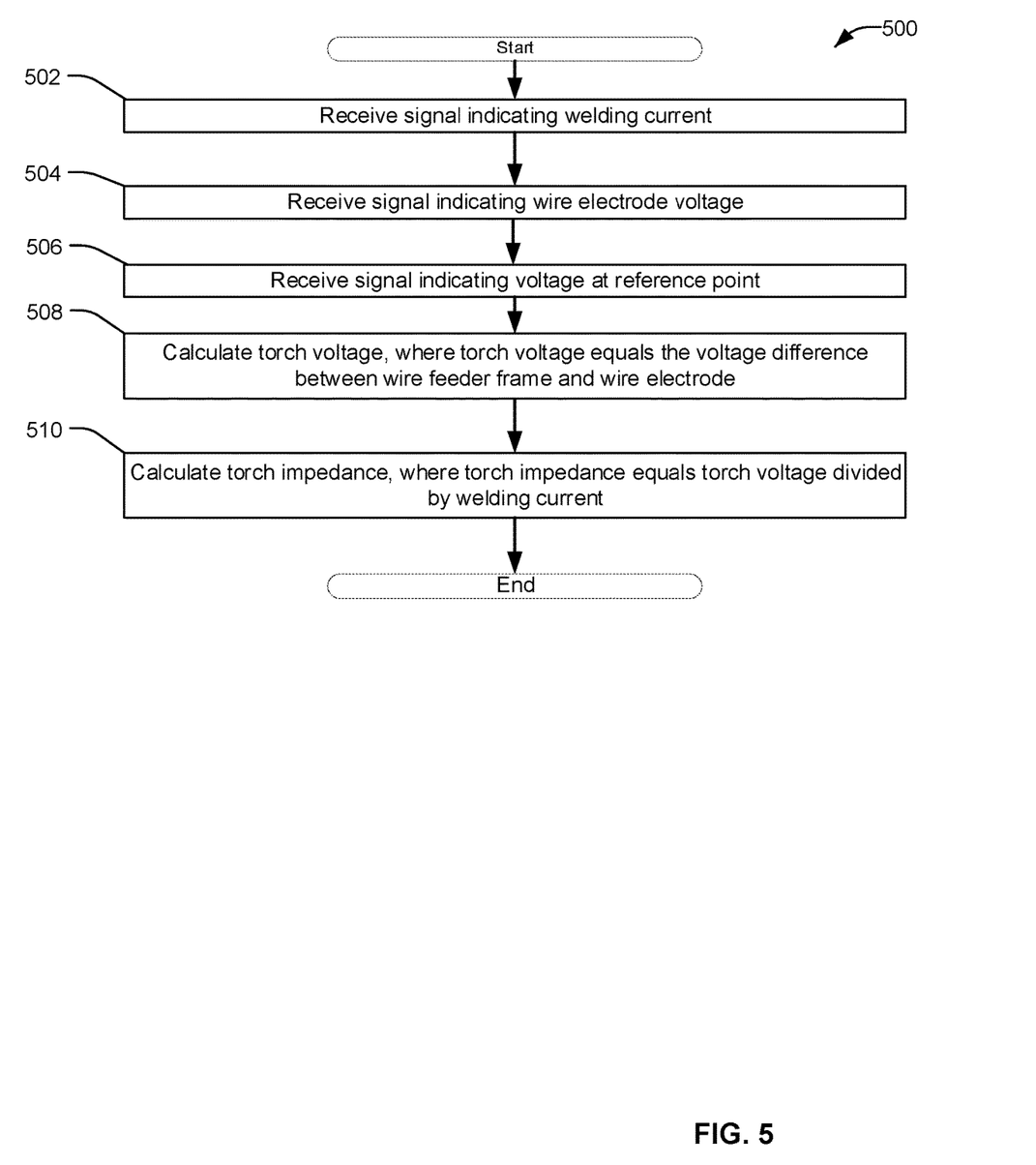
FIG. 5 is a flow chart representative of example machine readable instructions that may be executed by a welding-type system to determine an impedance of a welding torch.

FIG. 5 is a flow chart representative of example machine readable instructions 500 which may be executed by the system 100 of FIG. 1 to determine torch impedance. The machine readable instructions 500 may be partially or completely implemented by the control circuity 152 or 156 of FIG. 1.

At block 502, the control circuit 152 receives a signal indicating the weld current. In some examples, the welding current is controlled by the welding-type power source 102, such that the control circuitry 152 retrieves the known welding-current value. In some examples, the welding current is measured by a current sensor, which sends a signal to the control circuitry 152 indicating the measured welding-current.

At block 504, the control circuitry 152 receives, from the first voltage sense lead 144, a signal indicating the voltage measured at the wire electrode 116. At block 506, the control circuitry 152 receives, from the second voltage sense lead 145, a signal indicating the voltage measured at a reference point, for example the wire feeder frame 110. At block 508, the control circuitry 152 calculates the torch 108 voltage, where the torch 108 voltage equals the voltage difference between the wire feeder frame 110 and the wire electrode 116. At block 510, the control circuitry 152 calculates the torch impedance, where the torch impedance equals the torch voltage calculated at block 508 divided by the welding current indicated at block 502.

Figure 6:
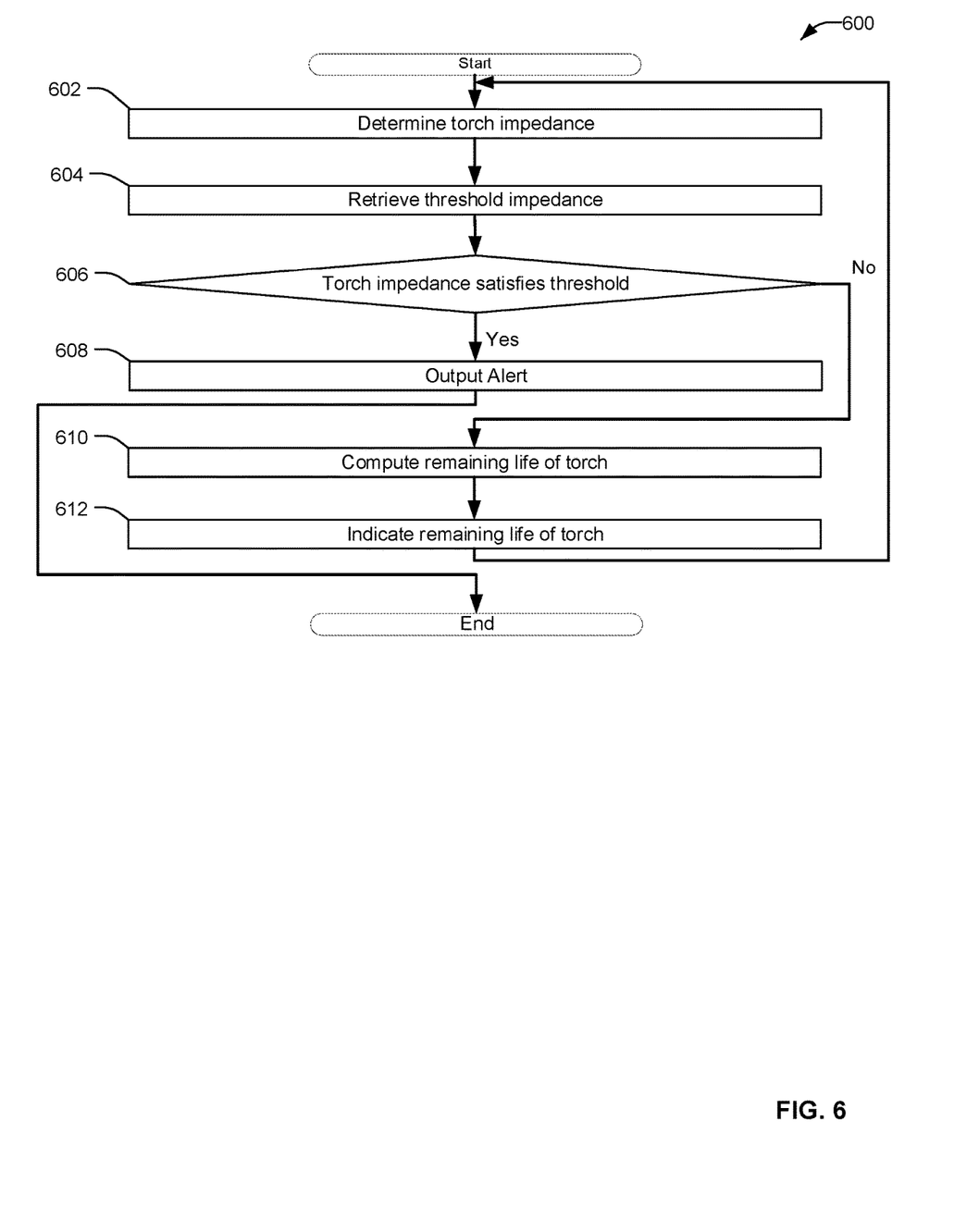
FIG. 6 is a flow chart representative of example machine readable instructions that may be executed by a welding-type system to determine if a welding torch has failed or requires maintenance based on the determined torch impedance.

FIG. 6 is a flow chart representative of example machine readable instructions 600 which may be executed by the system 100 of FIG. 1 to determine a whether a welding torch had failed based on the torch impedance. The machine readable instructions 600 may be partially or completely implemented by the control circuity 152 or 156 of FIG. 1

At block 602, the control circuitry 152 determines the torch 108 impedance, for example using the method 500 of FIG. 5. At block 604, the control circuitry 152 retrieves, from memory, a threshold impedance, which is an impedance which indicates that the torch 108 has failed or requires maintenance. In some examples, the threshold impedance may be entered by a user into a user interface 159 of the wire feeder 104, a user interface 153 the welding-type power supply 102, or an external computing device 160. In some examples, a user enters the torch type into a user interface (153, 159, 160), and the control circuitry 152 retrieves from the threshold from memory based on the torch type. The memory may include a database that correlates torch types and threshold impedances. In some examples, the torch may have an RFID tag which is scanned by am RFID reader located at the wire feeder 104. The RFID tag may include information indicating a threshold impedance, which may be sent to the control circuitry 152 and stored in memory. In some examples, RFID tag indicates the torch type, and the control circuitry 152 retrieves the threshold impedance from memory based on the torch type.

At block 606, the control circuitry 152 compares the torch impedance determined at block 602 to the threshold impedance. If the torch impedance satisfies the threshold impedance (e.g., exceeds the threshold) (block 606), then at block 608 the control circuitry 152 outputs a signal indicating that the torch 108 has failed or requires maintenance. The control circuitry 152 may output a signal to a user interface 159 of the wire feeder 104, a user interface 153 of the welding-type power source 102, or an external computing device 160 which indicates that the torch has failed or requires maintenance. In some examples, the control circuitry 152 may disable the system 100 (e.g., send a signal to disable power to the torch 108, send a signal to shut off power to the wire feeder 104, send a signal to stop feeding wire, etc.), until the torch 108 has been replaced or serviced. In some examples, the control circuitry 152 may send a signal via communications circuitry 154 to an external computing device 160 to schedule maintenance on the torch 108.

In some examples, if the torch impedance does not satisfy the threshold impedance (block 606), then at block 610, the control circuitry 152 calculates the remaining life of the torch 108, where remaining life may correspond to usage time. As explained below with reference to FIG. 7, the control circuitry 152 may compute the remaining life of the torch based on the trends in torch impedance and the threshold impedance. At block 612, the control circuitry sends a signal to indicate the remaining torch life calculated at block 610. The signal may be sent to a user interface 159 of the wire feeder 104, a user interface 153 of the welding-type power supply 102, or an external computing device 160. Determining the useful remaining life may be advantageous, for example, because the control circuitry may send a signal to schedule maintenance on the torch 108 prior to the torch failing and preferably during a scheduled system down time.

Figure 7:
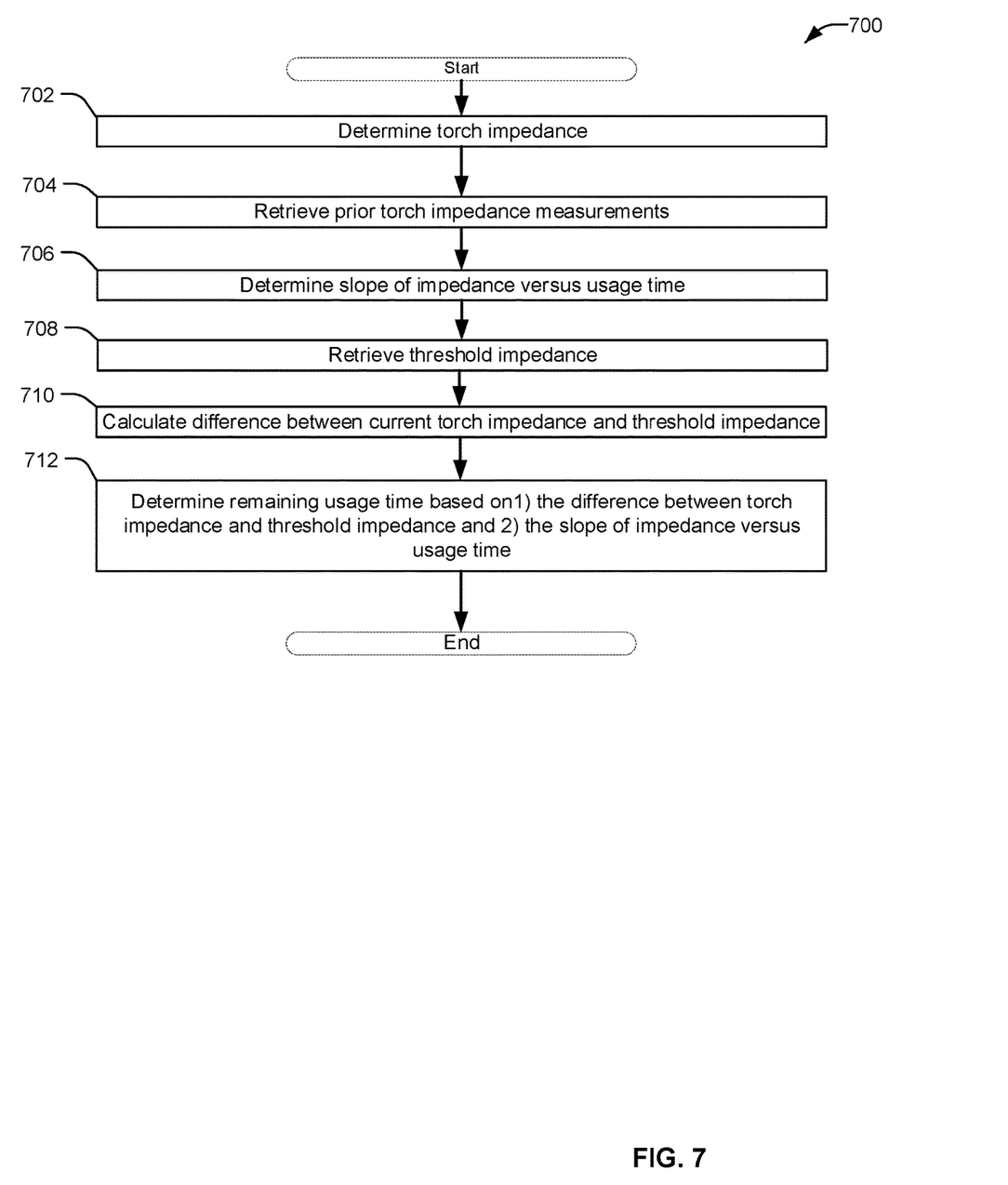
FIG. 7 is a flow chart representative of example machine readable instructions that may be executed by a welding-type system to determine a remaining usage time of a welding torch based on a determined torch impedance.

FIG. 7 is a flow chart representative of example machine readable instructions 700 which may be executed by the system 100 of FIG. 1 to determine a remaining life of a torch based on the torch impedance. The machine readable instructions 700 may be partially or completely implemented by the control circuity 152 or 156 of FIG. 1

At block 702, the control circuitry 152 determines the torch 108 impedance, for example using the method 500 of FIG. 5. At block 704, the control circuitry 152 retrieves prior torch impedance measurements stored in memory. The control circuitry 152 may take samples of the torch impedance at a particular sampling rate and store those samples in memory.

At block 706, the control circuitry 152 determines the slope of the impedance versus usage time. In some examples, the control circuitry 152 determines the slope of the line that approximates the line that would pass through the impedance samples graphed against the usage time (i.e., the usage time at which each of the samples were taken). In some examples, the control circuitry 152 may only use the most recent X number of impedance samples, where X can be one sample, two samples, three samples, etc.

At block 708, the control circuitry 152 retrieves the threshold impedance from memory. At block 710, the control circuitry calculates the difference between the torch impedance determined at block 702 and the threshold impedance.

At block 712, the control circuitry 152 determines the remaining usage time of the torch 108 based on: 1) the difference between the torch impedance and the threshold impedance and 2) the slope of impedance versus usage time. As an example, if the difference between the torch impedance and the threshold impedance is $2 \times 10^{-3}$ ohms, and the slope of the impedance versus usage time is $2 \times 10^{-5}$ per hour, then the remaining usage time is 100 hours.

Figure 8:
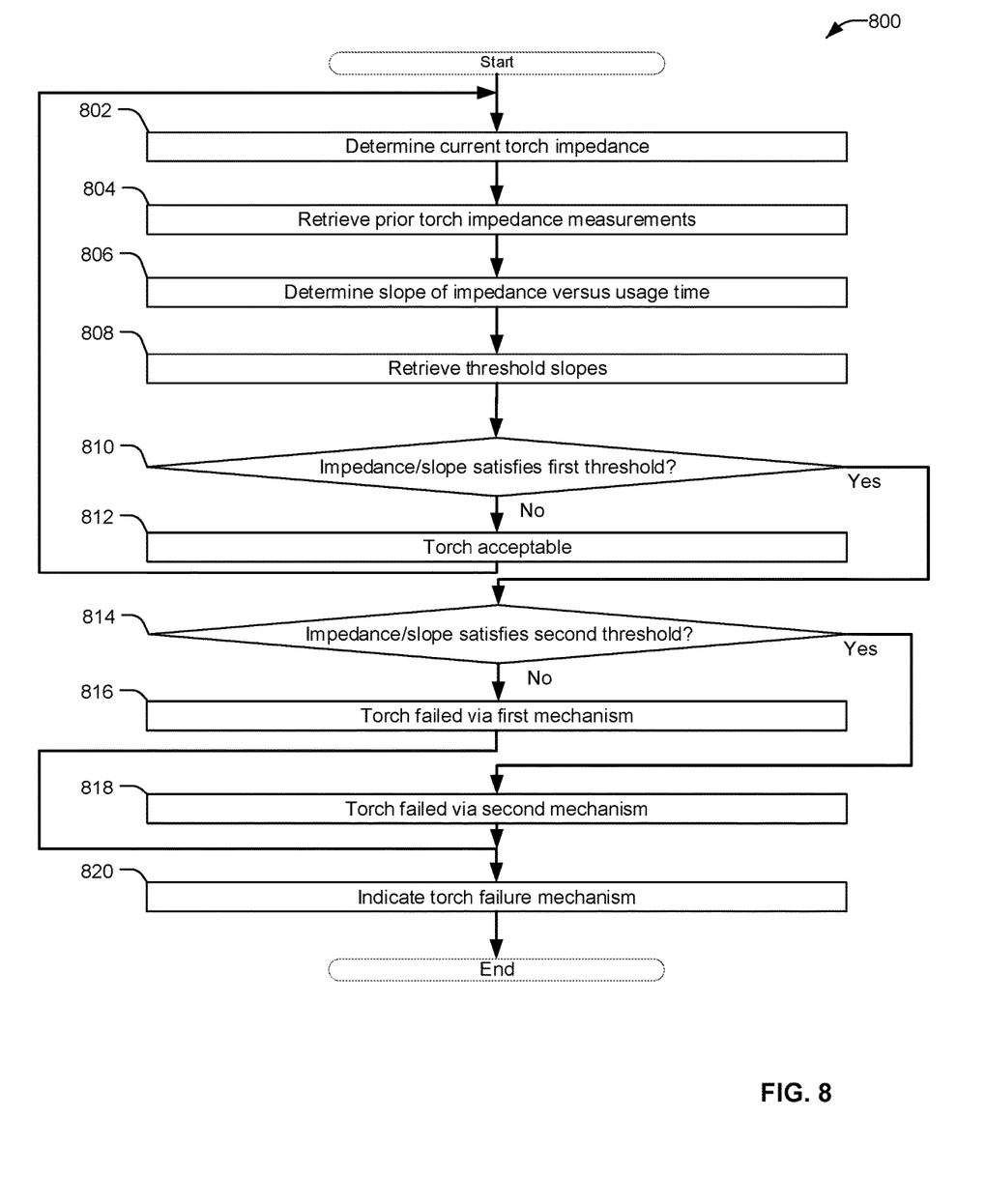
FIG. 8 is a flow chart representative of example machine readable instructions that may be executed by a welding-type system to determine a failure mechanism of a welding torch based on the determined torch impedance.

FIG. 8 is a flow chart representative of example machine readable instructions 800 which may be executed by the system 100 of FIG. 1 to determine a failure mechanism of a welding torch. The machine readable instructions 800 may be partially or completely implemented by the control circuitry 152 or 156 of FIG. 1

At block 802, the control circuitry 152 determines the torch 108 impedance, for example using the method 500 of FIG. 5. At block 804, the control circuitry 152 retrieves prior torch impedance measurements stored in memory. At block 806, the control circuitry 152 determines the slope of the impedance versus usage time. In some examples, the control circuitry finds the slope of the line that approximates the line that would pass through the impedance samples graphed against the usage time (i.e., the usage time at which each of the samples were taken). In some examples, the control circuitry 152 may only use the most recent X number of impedance samples, where X can be one sample, two samples, three samples, etc. At block 808, the control circuitry 152 retrieves threshold slopes from memory.

At block 810, the control circuitry 152 compares the determined impedance and/or slope to a first threshold. If the impedance and/or slope is less than the first threshold, then at block 812 the control circuitry 152 determines that the torch has not failed (i.e., is acceptable). The torch returns to block 802 to continue to monitor the torch slope and impedance.

If the impedance and/or slope does satisfy the first threshold (block 810), then at block 814 the control circuitry 152 compares the impedance and/or slope to a second threshold. If the impedance and/or slope does not satisfy the second threshold (block 814), then at block 816 the control circuitry 152 determines that the torch 108 failed via a first mechanism. A first mechanism may be, for example, a loose connection within the conductor or a severed conductor. If the impedance and/or slope satisfies the second threshold (block 814), then at block 818, the control circuitry determines that the torch failed via a second failure mechanism. For example a second failure mechanism may be a conductor decay or damaged insulation.

At block 820, the control circuitry 152 sends a signal indicating the torch failure type determined at blocks 810-818. The signal may cause a user interface at the wire feeder 104, the welding-type power source 102, or an external computing device 160 to indicate to a user the failure mechanism. The control circuitry 152 may also send, via communications circuitry 154, a signal to an external computing device 160 to schedule maintenance for the torch 108 based on the determined failure type.

Although the machine readable instructions 800 include two failure mechanisms, more impedance and/or slope thresholds and failure types may be correlated and implemented by the control circuitry.

The impedance and/or slope in disclosed examples can be other criteria derived from V torch and/or $R_{torch}$ data, such as features in $R_{torch}$ over time. In some examples, the control circuitry 152 may also determine a rate of change of the slope, and determine a failure type based on the rate of change of the slope by comparing the rate of change of the slope to threshold slope change rates, similarly to the method described with reference to FIG. 8.

In some examples, the control circuitry 152 may plot the impedance samples versus usage time to determine a shape of the trend line of the impedance samples. The control circuitry may then compare the shape of the plotted trend line to trend lines stored in memory, where trend lines stored in memory correspond to specific failure mechanisms of the torch. The control circuitry may determine a failure type by determining which trend line retrieved from memory the actual trend line most resembles.

While examples are disclosed above with reference to GMAW, disclosed examples may be modified to use other wire-fed processes, such as flux-cored arc welding (FCAW).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system comprising:
    a welding torch comprising a contact tip configured to conduct welding-type current to a wire electrode;
    a conductive path to deliver welding power from a welding-type power supply to the contact tip;
    a wire feeder comprising a receptacle configured to transfer the welding-type current to the welding torch via a torch connector, and to position the torch connector to receive the wire electrode;
    an electrically insulated path to deliver the wire electrode from a wire electrode source to the contact tip; and
    control circuitry configured to determine or obtain a first voltage or first impedance between a retaining head of the welding torch or the contact tip and the receptacle or a frame enclosing the wire feeder, a second voltage or second impedance between the retaining head of the welding torch or the contact tip and a front end of a cable of the welding torch, and a third voltage or third impedance between the retaining head of the welding torch or the contact tip and a gooseneck of the welding torch.

2. The welding system of claim 1, wherein the wire feeder further comprises one or more drive rolls configured to drive the wire electrode to the welding torch, the one or more drive rolls being electrically insulated from the frame.

3. The welding system of claim 1, further comprising control circuitry configured to determine at least one condition of the welding torch based on the first, second, or third voltage or the first, second, or third impedance.

4. The welding system of claim 1, further comprising control circuitry configured to determine the first, second, or third impedance based on the first, second, or third voltage divided by a measured welding-type current.

5. The welding system of claim 1, further comprising control circuitry configured to:
    compare the first, second, or third impedance to a first, second, or third threshold impedance; and
    output a signal when the first, second, or third impedance exceeds the first, second, or third threshold impedance.

6. The welding system of claim 5, wherein the signal provides an alert to an operator.

7. The welding system of claim 5, wherein the signal comprises a command to cut off the welding power to the welding torch, cut off the welding power to the wire feeder, or shutdown the wire feeder.

8. The welding system of claim 1, further comprising control circuitry configured to:
monitor a change in the first, second, or third impedance; and
predict a type of torch failure based on the change.

9. The welding system of claim 8, wherein the type of torch failure is one of a broken conductors inside the cable of the welding torch, a loose connection between components, improper installation of a component, a decayed rotating connection, or a damaged insulation failure.

10. The welding system of claim 1, further comprising control circuitry configured to:
monitor a rate of increase in the first, second, or third impedance; and
predict a type of torch failure based on the rate.

11. The welding system of claim 1, further comprising control circuitry configured to:
monitor a change in the first, second, or third impedance; and
predict a failure time based on the change.

12. The welding system of claim 1, comprising a wire guide configured receive the wire electrode and guide the wire electrode to one or more drive rolls, the wire guide comprising:
a conductive layer configured to guide the wire electrode; and
an insulative layer configured to electrically insulate the wire electrode and the conductive layer from the frame.

13. The welding system of claim 12, wherein the wire guide comprises a mono-coil spring.

14. The welding system of claim 1, further comprising control circuitry configured to:
compare the first voltage or the first impedance between the retaining head of the welding torch or the contact tip and the receptacle or the frame enclosing the wire feeder, and the second voltage or second impedance between the retaining head of the welding torch or the contact tip and the front end of the cable of the welding torch to one or more threshold voltages or threshold impedances;
determine or predict a location of a failure in the welding torch based on the comparison; and
output a signal indicating the failure.

15. A welding system comprising:
a welding torch comprising a contact tip configured to conduct welding-type current to a wire electrode;
a conductive path to deliver welding power from a welding-type power supply to the contact tip;
a wire feeder comprising a receptacle configured to transfer the welding-type current to the welding torch via a torch connector, and to position the torch connector to receive the wire electrode;
an electrically insulated path to deliver the wire electrode from a wire electrode source to the contact tip; and
control circuitry configured to determine or obtain a first voltage or first impedance between the receptacle or a frame enclosing the wire feeder and a retaining head or the contact tip of the welding torch, a second voltage or second impedance between the receptacle or the frame enclosing the wire feeder and a front end of a cable of the welding torch, and a third voltage or third impedance between the receptacle or the frame enclosing the wire feeder and a gooseneck of the welding torch.

* * * * *